Patented Dec. 11, 1928.

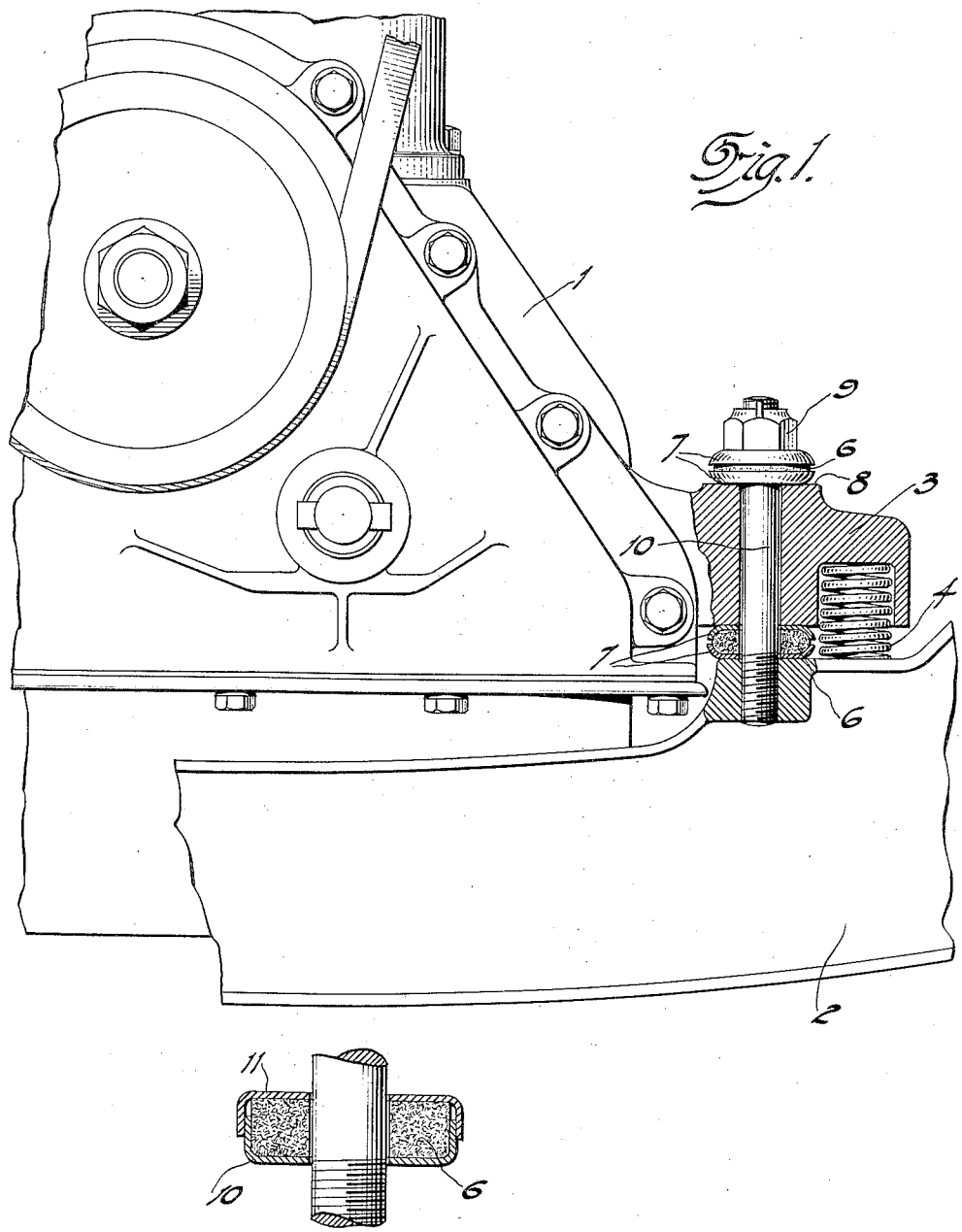

1,694,758

UNITED STATES PATENT OFFICE.

CALEB E. SUMMERS AND ROGER KENNETH LEE, OF DETROIT, MICHIGAN, ASSIGNORS TO GENERAL MOTORS RESEARCH CORPORATION, OF DETROIT, MICHIGAN, A CORPORATION OF DELAWARE.

MOTOR MOUNTING.

Application filed July 17, 1926. Serial No. 123,107.

This invention relates to cushioned mountings particularly applicable to automobile engine supports, for the purpose of deadening or absorbing the motor vibrations, as well as road shocks. The invention is also useable in other connections, as for instance, in spring shackle constructions, automobile body mountings and the like.

Continual vibrations, through rigid mountings, result in unnecessary wear and breakage of parts, as well as disagreeable noises, throughout the entire frame, necessitating repairs from time to time and detracting from the pleasure of the automobile passengers.

One of the primary objects of the present invention is to provide a simple and inexpensive mounting, which will be easy to manufacture and assemble, of few parts, automatic in operation, require no attention, positive in action and unlikely to get out of repair.

A further object of the invention is to provide a resilient mounting which will relieve jars and strains, yet properly and firmly position the parts and result in better motor operation.

In the drawings, Figure 1 is a front elevation fragmentarily showing an internal combustion engine mounted on the chassis frame of an automobile, partly in section, illustrating the preferred form of vibration absorbing connection.

Figure 2 illustrates a modified form of the absorbing element.

Automobile engines are usually suspended at three or more points. The figure in the drawing represents one of such suspension points, wherein the engine 1 is supported upon a transverse frame member 2. A lateral foot or arm 3 projects from the side of the engine and has a circular recess or indention on its under surface. Seated in the recess is the compression spring 4 having its lower extremity resting on the top of the supporting frame member 2. Normally, the tension of this spring 4 bears the entire load or down thrust of the engine and thus the motor has a floating connection with the frame.

The vibration absorbing element consists of a comparatively thin disc or washer 6 of high grade vulcanized soft rubber possessing elastic properties of a high degree, but having no cold flow. That is, the rubber is of such quality that after compression it will always return to its original shape regardless of distortion. Oppositely disposed concave cups or plates 7 retain the rubber disc 6 and are so positioned as to permit only a slight compression of the rubber by restricting its distortion. In the construction illustrated, two of such vibration absorbing elements are employed, one being shown in section, between the lower surface of the arm 3 and the top of the supporting frame 2, while the second element rests on an enlarged seat 8 on the top of the arm 3 and between such seat 8 and a nut or head 9 threaded on a stud 10, which extends through a hole in the arm 3 and in turn has screw threaded engagement with the frame 2, serving to hold the parts in place. In lieu of a stud threaded at both ends and a nut or head detachably engaging the upper end, a stud or pin having an integral head may be employed. The diameter of the stud is slightly smaller than the hole in the arm, permitting the arm to freely slide on the stud and to shift laterally.

In the past, cushioned mountings have very generally been rather thick pads of rubber and were intended to take up all the vibrations. Such mountings have been found to possess certain disadvantages such as affording too high a degree of flexibility and an unstable connection. Vibrations caused by the internal working of the motor are of very small degree, usually not exceeeding three or four thousandths of an inch. It is such small vibrations to which this invention is particularly directed.

To this end the spring 4 is so tensioned as to support the entire load, exerting its force upwardly to maintain the motor arm 3 in its normal position, and the rubber discs uncompressed. Slight vibrations of the arm 3 will move the cups 7 toward each other causing the rubber to compress to compensate for such movement and thus freeing the frame of the vibration. However, the displacement of the rubber is limited and after it fills the narrow annular space between the ends of the two cups it can give no further and thereafter rigidly resists vibrations. The restricted displacement thus limits the elasticity of the rubber readily permitting slight movement, and resulting in a rigid mounting after the limit is reached. The smaller vibrations of the motor are absorbed quite freely, but owing to the rubber reaching the limit of its movement, the mounting becomes resistant to torque reactions and other vibrations of large amplitude.

The modified form of vibration absorbing cushion shown in Figure 2 consists of two telescoping cups 10 and 11, with their ends overlapping. Above the upper edge on the inner cup 10 and between the outer cup 11 and the rubber is a slight clearance, into which the rubber is displaced upon compression. In both forms of vibration absorbing element shown, an additional clearance may be left at the inner periphery of the rubber and between the stud surface. The rubber in such instance fills up the clearance and hugs the surface of the stud.

As a further modification and under some conditions of use, a small helical spring properly tensioned, may be substituted for the rubber disc, with proper stops to limit deflection.

While the parts and arrangement have been described more or less specifically, it is obvious that various modifications may be made without departing from the spirit or scope of the invention as set forth in the appended claims.

Having described the invention we claim:

1. In a device of the character described, the combination of a support, a body to be supported, a flexible mounting therebetween permitting floating of the body, and a vibration absorbing element for the body consisting of compressible elements and means to limit their deflection.

2. In a device of the character described, the combination of a support, a body to be supported, a flexible mounting therebetween permitting floating of the body and means to absorb vibrations of the body consisting of discs of live rubber interposed between the support and floating body, and retainers for the discs permitting but a slight deflection thereof.

3. In a device of the character described, the combination of a support, a body to be supported, having a lateral foot extending therefrom, a flexible mounting between the support and foot to float the weight of the body, and cushioning means, including a stud carried by the support extending through the foot, having a head at its extremity, cushioning elements between the head and top of the foot and between the bottom of the foot and support, each cushioning element consisting of a disc of live rubber, normally uncompressed but adapted to be compressed upon vibratory movement to deaden such vibration, and oppositely disposed retaining cups for the rubber limiting the deflection of the rubber and maintaining the cushioning elements rigid after the limited degree of deflection has been reached.

4. In a device of the character described, the combination of a support, a body to be supported, having a lateral foot, a flexible element interposed between the support and foot to floatingly support the weight of the body on said support, and cushioning means independent of said flexible element including a vertical stud carried by the support extending through a hole in the foot, vibration absorbing elements carried upon the stud and disposed above and below the foot to absorb vertical vibrations in either direction but relieved of the weight of said body by the flexible element, the stud being of slightly smaller diameter than the hole in the foot, thereby permitting lateral shifting movement of the body.

5. In a device of the character described, the combination of a support, a body to be supported having an indentation on its under face and a vertical hole extending entirely therethrough, a spring carried by the support and seating in the indentation, the tension of which bears the weight of the supported body, a headed pin extending through the hole and having anchoring engagement with the support whereby said body is held in place, and cushioning bodies carried by the pin compressed upon vibratory movements of the arm to absorb such vibrations but relieved of the weight of the supported body by the spring tension.

6. A vibration absorbing mounting including a tension spring floatingly bearing the weight of the body to be supported, a cushioning element of non-metallic deformable material, oppositely disposed retaining cups for the cushioning element to limit the deformation thereof, the relative movement of the supported and supporting bodies under vibration pressing the cups together to deform the cushioning element for absorption of such vibratory movement.

7. In a device of the character described, the combination of a support, a body to be supported having a lateral foot extending therefrom, a resilient member interposed between the support and said foot to floatingly bear the weight of said body, and means to absorb vibrations of the body consisting of cushioning elements carried by the frame and located respectively above and below said lateral foot, said cushioning elements being relieved of the dead weight of said body by the resilient member.

8. The structure of claim 7, wherein each of said cushioning elements comprise a relatively thin pad of live rubber and a retainer therefor, which restricts displacement of the rubber within predetermined limits.

In testimony whereof we affix our signatures.

CALEB E. SUMMERS.
ROGER KENNETH LEE.